United States Patent
Kim (10) Patent No.: US 10,218,725 B2
(45) Date of Patent: Feb. 26, 2019

(54) DEVICE AND METHOD FOR DETECTING COMMAND AND CONTROL CHANNEL

(71) Applicant: Naru Security, Inc., Seoul (KR)

(72) Inventor: Hyukjoon Kim, Seoul (KR)

(73) Assignee: Naru Security, Inc., Seoul (KR)

( * ) Notice: Subject to any disclaimer, the term of this patent is extended or adjusted under 35 U.S.C. 154(b) by 278 days.

(21) Appl. No.: 15/120,526

(22) PCT Filed: Feb. 26, 2014

(86) PCT No.: PCT/KR2014/001551
§ 371 (c)(1),
(2) Date: Aug. 22, 2016

(87) PCT Pub. No.: WO2015/129934
PCT Pub. Date: Sep. 3, 2015

(65) Prior Publication Data
US 2017/0013004 A1    Jan. 12, 2017

(30) Foreign Application Priority Data
Feb. 25, 2014  (KR) ........................ 10-2014-0022130

(51) Int. Cl.
*H04L 21/00*      (2006.01)
*H04L 29/06*      (2006.01)

(52) U.S. Cl.
CPC ...... *H04L 63/1425* (2013.01); *H04L 63/1458* (2013.01); *H04L 2463/142* (2013.01)

(58) Field of Classification Search
CPC ............. H04L 63/1425; H04L 63/1458; H04L 2463/142
See application file for complete search history.

(56) References Cited

U.S. PATENT DOCUMENTS

2008/0235771 A1*  9/2008  Corley ............... G06F 21/53
                                                       726/4
2010/0100443 A1*  4/2010  Hoashi ............... G06Q 30/02
                                                       705/14.54
(Continued)

FOREIGN PATENT DOCUMENTS

KR   10-2005-0090640   9/2005
KR   10-2009-0005662   1/2009
(Continued)

OTHER PUBLICATIONS

International Search Report dated Nov. 24, 2014 From the Korean Intellectual Property Office Re. Application No. PCT/KR2-14/001551 and Its Translation Into English.

*Primary Examiner* — Morshed Mehedi (57) ABSTRACT

A device for detecting a command and control channel includes: a session log collector for collecting log information of sessions generated between at least one communication device of the first network and at least one communication device of the second network; an analyzer for generating test data for respective sessions based on the log information, and calculating a test data distribution based on test data of the sessions; and a determiner for extracting a test data value corresponding to an abnormal distribution from the test data distribution based on an abnormal distribution determination standard, and estimating sessions relating to the extracted test data value as a command and control channel.

16 Claims, 8 Drawing Sheets

(56) References Cited

U.S. PATENT DOCUMENTS

| | | | | |
|---|---|---|---|---|
| 2011/0196971 A1* | 8/2011 | Reguraman | ............ | H04L 45/00 709/228 |
| 2012/0259969 A1* | 10/2012 | Mastrangelo | ....... | G06F 11/3419 709/224 |
| 2013/0031470 A1* | 1/2013 | Daly, Jr. | ........... | G06F 17/30867 715/243 |
| 2015/0205957 A1* | 7/2015 | Turgeman | ............. | G06F 21/554 726/23 |

FOREIGN PATENT DOCUMENTS

| | | |
|---|---|---|
| KR | 10-2011-0009811 | 1/2011 |
| WO | WO 2015/129934 | 9/2015 |

* cited by examiner

DEVICE AND METHOD FOR DETECTING COMMAND AND CONTROL CHANNEL

RELATED APPLICATIONS

This application is a National Phase of PCT Patent Application No. PCT/KR2014/001551 having International filing date of Feb. 26, 2014, which claims the benefit of priority of Korean Patent Application No. 10-2014-0022130 filed on Feb. 25, 2014. The contents of the above applications are all incorporated by reference as if fully set forth herein in their entirety.

FIELD AND BACKGROUND OF THE INVENTION

The present invention relates to a device and method for detecting a command and control channel.

Recently, various sorts of target attacks such as a denial of service (DoS) attack, personal information hacking, financial agencies hacking, and cyber terrors have been increasing, starting from the distributed denial of service (DoS) attack. There are various kinds of attackers and attacking methods, and a common ground thereof is that an external part of a network to be attacked and is connected to an internal part of the network to be attacked by a command and control channel and the attack is performed.

The attack through the command and control channel represents an advanced persistent attack. An attacker stays with the network to be attacked for several months, collecting information, attacking the internal network, destroying the system, and hacking information. The network to be attacked is generally protected by a firewall or an intrusion detecting device, so the attacker transmits emails attached with malware to the system to be attacked or installs malicious codes in the system to be attacked during Internet surfing to obtain an initial intrusion route leading to the system to be attacked.

In particular, recently, the command and control channel has not been maintained, but the internal network device contaminated by the attacker periodically attempts access to the attacker provided on the outer side to generate a command and control channel.

The intrusion detecting device up to now detects the command and control channel based on a technical characteristic of the command and control channel. That is, the intrusion detecting device uses known information such as a specific signature or a malicious Internet address to detect the command and control channel. However, such detecting method detects known malicious behavior so it only detects low-level attacks for copying already used attacking methods and has a difficulty in detecting attacks using new command and control channels. Therefore, new detecting methods for processing recent attacking methods are required.

SUMMARY OF THE INVENTION

The present invention has been made in an effort to provide a command and control channel detecting device and method for detecting a command and control channel based on access information of sessions connected between an internal network and an external network.

An exemplary embodiment of the present invention provides a device for detecting a command and control channel as a device for detecting a command and control channel connected between a communication device of a first network and an attacker device of a second network, including: a session log collector for collecting log information of sessions generated between at least one communication device of the first network and at least one communication device of the second network; an analyzer for generating test data for respective sessions based on the log information, and calculating a test data distribution based on test data of the sessions; and a determiner for extracting a test data value corresponding to an abnormal distribution from the test data distribution based on an abnormal distribution determination standard, and estimating sessions relating to the extracted test data value as a command and control channel.

The test data may include at least one of an access period, an access duration, and a transmitted and received data size.

The test data distribution may include one of an access period distribution including a number of sessions for respective access periods, an access duration distribution including a number of sessions for respective access durations, and a data size distribution including a number of sessions for respective transmitted and received data sizes.

The determiner may determine a test data value with a number of sessions that is greater than a predetermined standard in the access period distribution as an abnormal distribution.

The determiner may determine a test data value with a number of sessions that is greater than a predetermined standard in the access duration distribution as an abnormal distribution.

The determiner may determine a test data value with a number of sessions that is greater than a predetermined standard in the data size distribution as an abnormal distribution.

The determiner may estimate sessions corresponding to an abnormal distribution in at least two distributions from among the access period distribution, the access duration distribution, and the data size distribution as a command and control channel.

The log information may include at least one of departure information of respective sessions, destination information, a timestamp, an access duration, and a transmitted and received data size.

Another embodiment of the present invention provides a method for detecting a command and control channel as a method for a command and control channel detecting device to detect a command and control channel connected between a communication device of a first network and an attacker device of a second network, including: generating test data for respective sessions based on log information of sessions generated between at least one communication device of the first network and at least one communication device of the second network; calculating a test data distribution based on test data of the sessions; extracting a test data value corresponding to an abnormal distribution from the test data distribution based on an abnormal distribution determination standard; and estimating sessions relating to the extracted test data value as a command and control channel.

The test data may include at least one of an access period, an access duration, and a transmitted and received data size.

The test data distribution may include one of an access period distribution including a number of sessions for respective access periods, an access duration distribution including a number of sessions for respective access durations, and a data size distribution including a number of sessions for respective transmitted and received data sizes.

The abnormal distribution determination standard may be a reference value relating to a number of sessions, and the extracting of test data values corresponding to an abnormal distribution may include determining a test data value with a number of sessions that is greater than the reference value as an abnormal distribution in the test data distribution.

The extracting of test data values corresponding to an abnormal distribution may include extracting test data values corresponding to an abnormal distribution from at least two distributions of the access period distribution, the access duration distribution, and the data size distribution, and the estimating of a command and control channel includes estimating sessions corresponding to the abnormal distribution from the at least two distributions as a command and control based on extracted test data values.

Yet another embodiment of the present invention provides a method for detecting a command and control channel as a method for a command and control channel detecting device to detect a command and control channel connected between a first communication device and a second communication device, including: allowing the first communication device to access the second communication device and collect log information of generated sessions; generating test data for respective sessions based on the log information; acquiring a test data distribution relating to a number of sessions for respective test data based on the test data of the sessions; determining whether there is a test data value with a number of sessions that is greater than a predetermined standard in the test data distribution; and estimating the second communication device as an attacker device when a test data value with a number of sessions that is greater than a predetermined standard is found.

The test data may include at least one of an access period, an access duration, and a transmitted and received data size.

The test data distribution may include one of an access period distribution including a number of sessions for respective access periods, an access duration distribution including a number of sessions for respective access durations, and a data size distribution including a number of sessions for respective transmitted and received data sizes.

Advantageous Effects

According to the exemplary embodiment of the present invention, the communication session generated for the command and control channel may be analyzed to distinguish normal access and malicious access. Therefore, according to the exemplary embodiment of the present invention, an attack without a signature may be detected as an attack caused by the command and control channel. According to the exemplary embodiment of the present invention, a gradually and precisely evolving attack on the internal network may be efficiently processed. According to the exemplary embodiment of the present invention, modified attacks or encrypted traffic may be detected so the attack on the internal network may be detected irrespective of attacking methods.

DESCRIPTION OF SPECIFIC EMBODIMENTS OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A device and method for detecting a command and control channel according to an exemplary embodiment of the present invention will now be described with reference to accompanying drawings.

Figure 1:
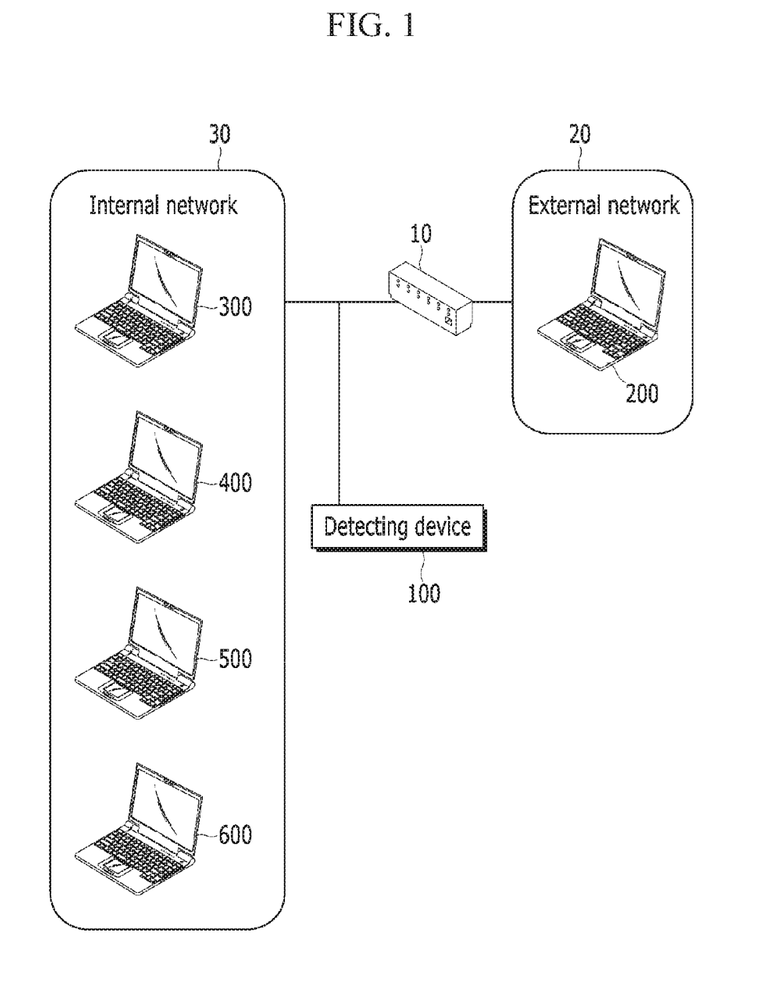
FIG. 1 shows a network relating to a device for detecting a command and control channel according to an exemplary embodiment of the present invention.

FIG. 1 shows a network relating to a device for detecting a command and control channel according to an exemplary embodiment of the present invention.

Referring to FIG. 1, the network includes a network device 10, an external network 20, an internal network 30, and a device for detecting a command and control channel (referred to as a "detecting device" hereinafter) 100. Here, an attacker device 200 will be assumed to be provided on the external network 20. There, it is divided into the external network 20 and the internal network 30 because an attacker accesses the attack target network 30 from outside of the attack target network 30, and the external network 20 and the internal network 30 are divided by the network device 10.

The network device 10 is a gateway to the internal network 30 and separates the external network 20 and the internal network 30. The network device 10 may be a gateway or a switch. The detecting device 100 is provided between the external network 20 and the internal network 30. The detecting device 100 may be implemented in the network device 10 or may be implemented to be separate from the network device 10.

The internal network 30 includes a plurality of communication devices 300, 400, 500, and 600.

When the network device 10 intercepts a direct access to an internal asset from the outside through a firewall, the attacker device 200 approaches the internal network 30 according to various methods and generates a communication device of the internal network 30 as an attack execution device. For example, the attacker device 200 may infect the internal network communication devices through malware attached to mails or programs. The infected device becomes an attack execution device for periodically accessing the attacker device 200 to receive a command and executing an operation according to the command. Here, the attack execution device is assumed to be the communication device 300.

The attack execution device 300 periodically accesses the attacker device 200. The attacker device 200 is then connected to the attack execution device 300 on the command and control channel. The attacker device 200 transmits the command to the attack execution device 300 through the command and control channel and receives information. That is, the attacker existing at the outside has to connect the communication device of the internal network and the command and control channel so as to continuously access the internal asset.

The detecting device 100 analyzes session information to detect a command and control channel. The detecting device 100 monitors the sessions connected between the external network 20 and the internal network 30 to collect session information. Here, the session signifies a connection generated for a data exchange between two communication devices. The session information represents various kinds of logs relating to the session, and includes departure information of the session, destination information, a timestamp, an access duration, and a transmitted and received data size. The departure information includes a departure address and a departure port. The destination information includes a destination address and a destination port.

The detecting device 100 generates test data for respective sessions based on the session information. The test data includes at least one of an access period, an access duration, and a transmitted and received data size.

The detecting device 100 calculates a test data distribution of the monitored sessions. That is, the detecting device 100 calculates an access period distribution including a number of sessions (frequencies) for respective access periods, an access duration distribution including a number of sessions for respective access durations, and a data size distribution including a number of sessions for respective data sizes.

When the test data distribution has a test data value showing a frequency that is greater than a predetermined standard, the detecting device 100 estimates the sessions with the corresponding test data value as a command and control channel. In this instance, the detecting device 100 may synthesize a plurality of test data distributions to determine the command and control channel.

Figure 2:
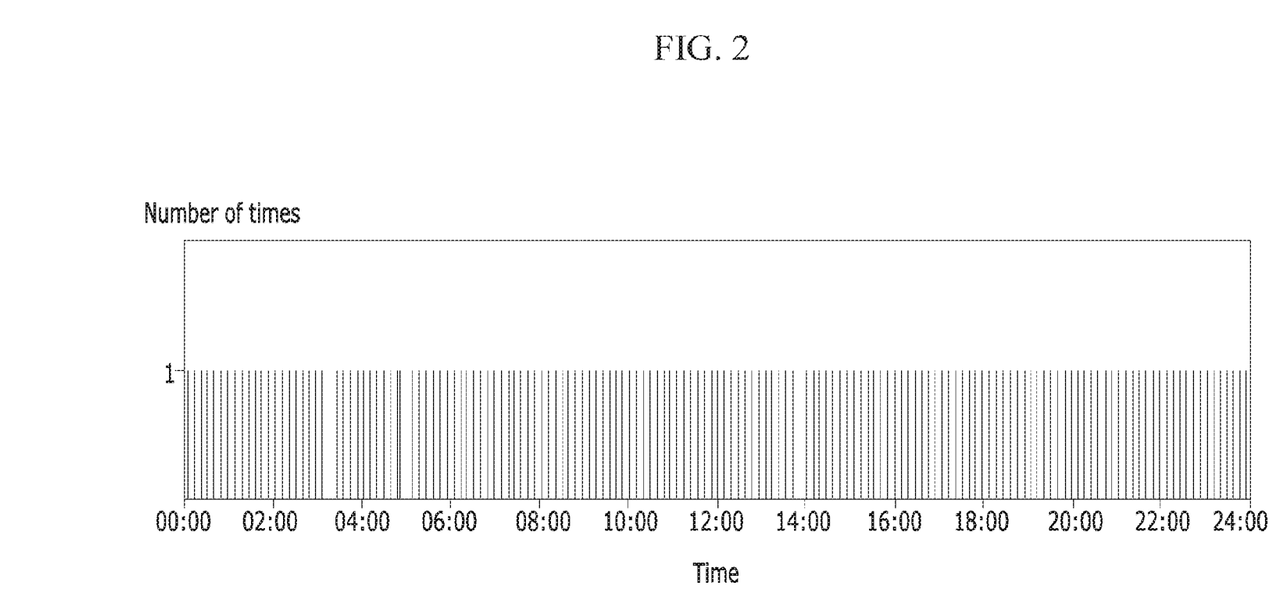
FIG. 2 shows a graph for showing a periodic access characteristic of a command and control channel.
Figure 3:
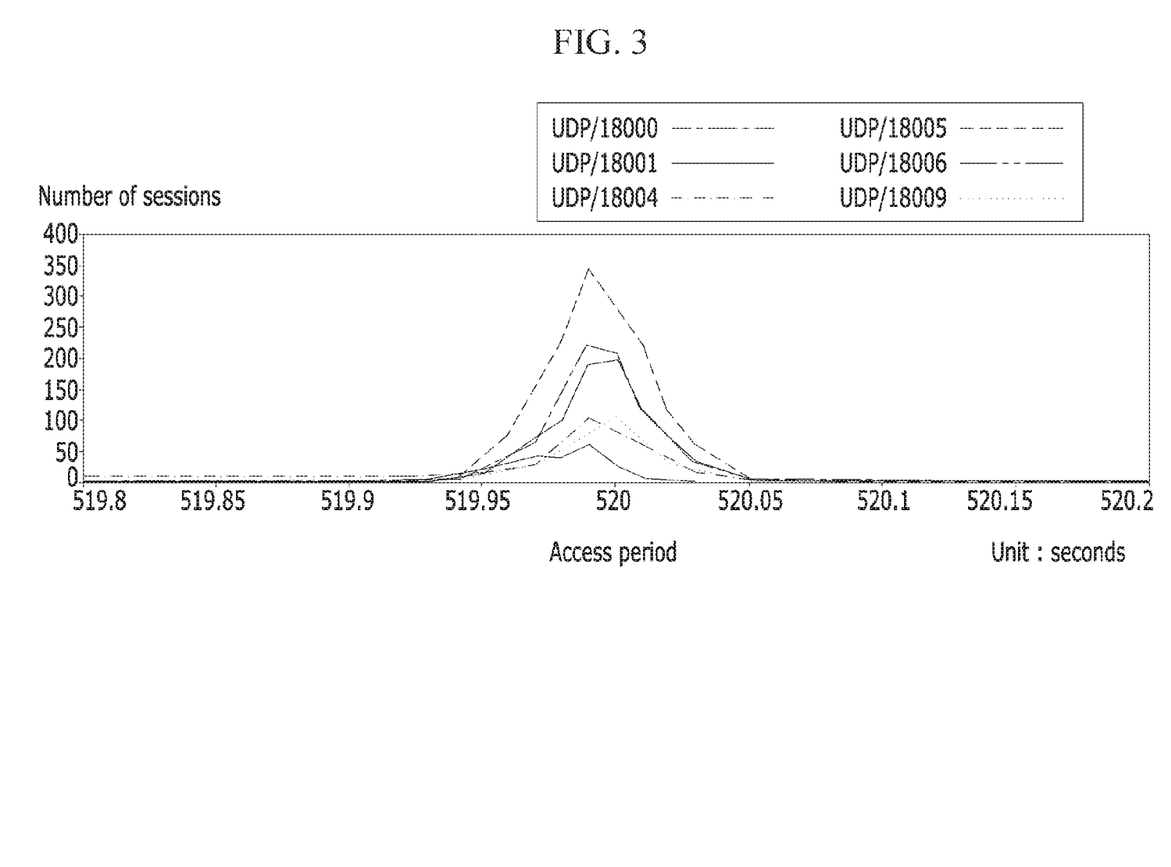
FIG. 3 shows a graph for showing an access period distribution according to an exemplary embodiment of the present invention.

FIG. 2 shows a graph for showing a periodical access characteristic of a command and control channel, and FIG. 3 shows a graph for showing an access period distribution according to an exemplary embodiment of the present invention.

Referring to FIG. 2, the command and control channel is periodically connected. The communication between normal communication devices has no periodicity, but the attack execution device 300 periodically accesses a specific server according to a malicious code installed therein as shown in FIG. 2.

However, a user may see a time domain graph shown in FIG. 2 to intuitively know the periodic access, but it is difficult for the detecting device 100 to determine the periodical access.

Therefore, the detecting device 100 detects the command and control channel based on the test data distribution instead of the time domain graph. This may be referred to as an analysis through a frequency domain graph.

Referring to FIG. 3, the detecting device 100 calculates an access period distribution of sessions. The access period distribution may be shown with a number of piled sessions having a horizontal axis corresponding to an access period value and a vertical axis corresponding to an access period value.

Referring to the access period distribution of FIG. 3, equal to or greater than a predetermined standard of sessions with the access period that is about 520 seconds are provided. By this, the detecting device 100 may estimate the sessions with the access period that is about 520 seconds with the command and control channel, and may estimate the external network device relating to the session estimated with the command and control channel as the attacker device. Through the access period distribution, the detecting device 100 may determine that the attacker maintains a secret command and control channel with a relatively long period (about nine minutes) in order to reduce a detection possibility occurring when he communicates with a short period.

The access period distribution represents statistical information so the detecting device 100 may filter the sessions in many ways based on the session information, and may generate an access period distribution graph using the filtered sessions. For example, the access period distribution graph may include an access period distribution of the sessions relating to one destination address or one departure address. In another way, the access period distribution graph may include the access period distribution of the entire sessions.

For example, the detecting device 100 may extract the access period distribution of the sessions relating to the communication device 200. The detecting device 100 may estimate the communication device 200 as an attack execution device when the number of sessions with the access period that is close to a specific value is greater than a predetermined standard.

Figure 4:
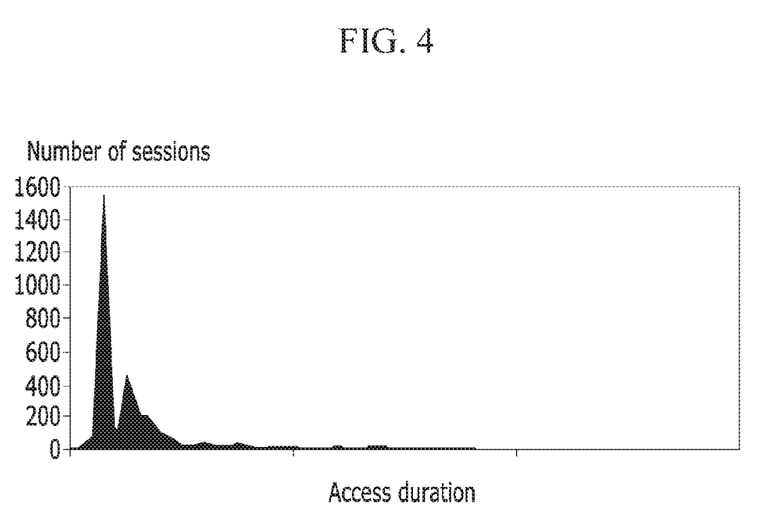
FIG. 4 shows a graph for showing a normal access duration characteristic.
Figure 5:
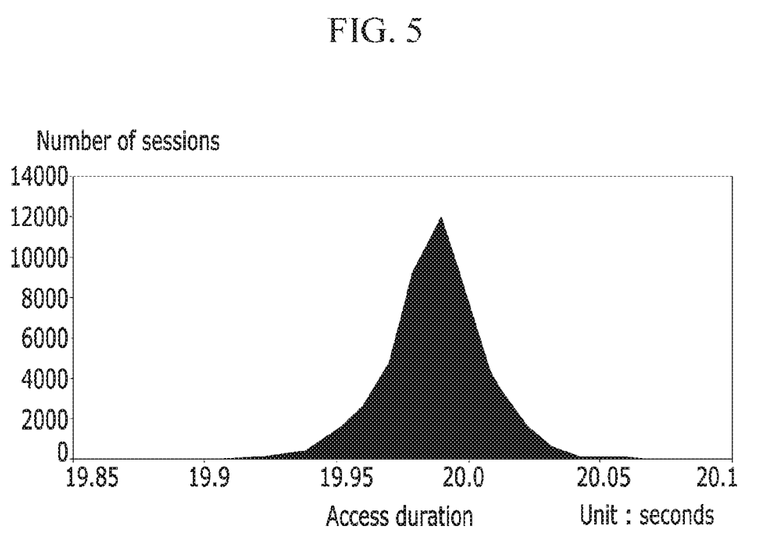
FIG. 5 shows a graph for showing an access duration distribution according to an exemplary embodiment of the present invention.

FIG. 4 shows a graph for showing a normal access duration characteristic, and FIG. 5 shows a graph for showing an access duration distribution according to an exemplary embodiment of the present invention.

Referring to FIG. 4, when a normal user accesses a specific server for a personal purpose, most of the access duration is less than a predetermined standard, and a small amount of connection of which the access duration is greater than the predetermined standard is provided. That is, the access duration of a normal session has a long tail pattern. Further, the access duration may be variable depending on the access purpose.

However, the access duration of the command and control channel that is programmed and mechanically generated may be fixed. Further, the command and control channel may be maintained for a long time so that the attacker may access a reverse channel through the command and control channel.

Referring to FIG. 5, the detecting device 100 calculates an access duration distribution of sessions. The access duration distribution may be shown with a number of piled sessions having a horizontal axis corresponding to an access duration value and a vertical axis corresponding to an access duration value.

Regarding the access duration distribution of FIG. 5, there are equal to or greater than a predetermined standard of sessions with the access duration of about 20 seconds. Through this, the detecting device 100 may estimate the sessions with the access duration of about 20 seconds as the command and control channel, and may estimate the external network device relating to the sessions estimated as the command and control channel as an attacker device.

The access duration distribution is statistical information so the detecting device 100 may generate an access duration distribution graph by using the sessions filtered in various manners based on the session information. For example, the access duration distribution graph may include an access duration distribution of the sessions relating to one destination address or one departure address. In another way, the access duration distribution graph may include the access duration distribution of the entire sessions.

A method for determining an abnormal state in the access duration distribution may be various, and the standard for determining the abnormal state is preset to the detecting device 100. For example, the access duration distribution caused by the normal session may be set to be a standard distribution, and the distribution for the case of which a form is different from the standard distribution by more than a predetermined standard may be determined to be an abnormal distribution. In another way, as shown in FIG. 5, in the case in which the number of sessions with the access duration that is greater than a predetermined standard is greater than a predetermined standard, the distribution in this case may be determined to be an abnormal distribution.

Figure 6:
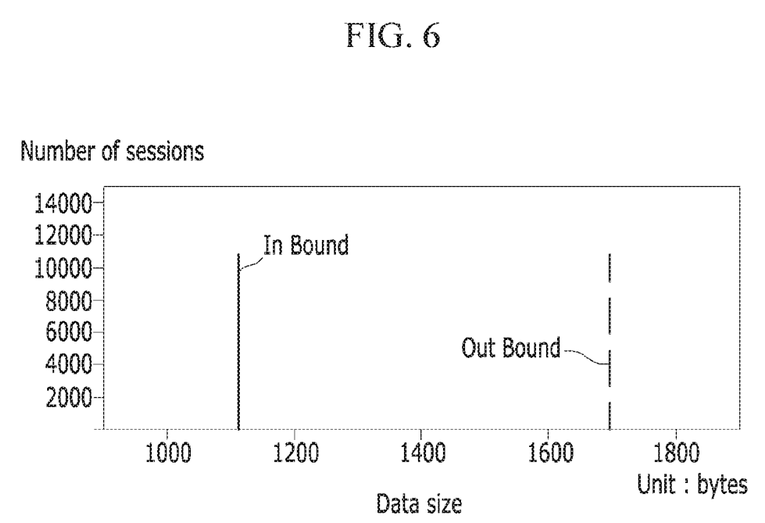
FIG. 6 shows a graph for showing a data size distribution according to an exemplary embodiment of the present invention.

FIG. 6 shows a graph for showing a data size distribution according to an exemplary embodiment of the present invention.

Referring to FIG. 6, the detecting device 100 calculates a transmitted and received data size distribution of sessions. The transmitted and received data size distribution may be shown with a number of piled sessions having a horizontal axis as a data size value and a vertical axis as a number of sessions corresponding to a data size value. The transmitted and received data size may include an outbound data size going to the external network from the internal network and an inbound data size coming to the internal network from the external network.

The malware installed by the attacker continuously attempts a communication connection to the attacker device so that the attacker may perform access at any time. In this instance, when continuous sessions are generated, the sessions for the attacker to perform an attack by use of the command and control channel are relatively small. That is, the communication between the attack execution device and the attack device is mainly performed so as to generate a session. Therefore, the data transmitted or received for generating a session is almost fixed so the transmitted data size (data amount) is not much changed.

Figure 7:
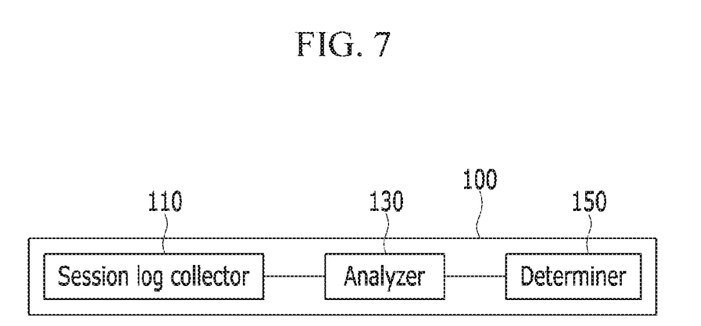
FIG. 7 shows a block diagram of a device for detecting a command and control channel according to an exemplary embodiment of the present invention.

According to the characteristic of the command and control channel, the session connected between the attack execution device and the attack device may show a data size distribution that has a majority number of sessions in a constant data size as shown in FIG. 7. On the contrary, not in a connection programmed by the attacker, but in the case in which a general user accesses the Internet or receives a download, transmitted and received data sizes are different.

FIG. 7 shows a block diagram of a device for detecting a command and control channel according to an exemplary embodiment of the present invention.

Referring to FIG. 7, the detecting device 100 includes a session log collector 110, an analyzer 130, and a determiner 150.

The session log collector 110 collects log information of the sessions generated between the internal network communication devices and the external network communication devices.

The analyzer 130 generates test data for respective sessions based on the log information. The test data includes at least one of an access period, an access duration, and a transmitted and received data size.

The analyzer 130 calculates a test data distribution by using the test data of respective sessions. The analyzer 130 calculates at least one of an access period distribution including a number of sessions for respective access periods, an access duration distribution including a number of sessions for respective access durations, and a data size distribution including a number of sessions for respective data sizes.

The determiner 150 extracts test data values corresponding to the abnormal distribution from the test data distribution based on an abnormal distribution determination standard. The determiner 150 may determine the test data value with a frequency or a frequency rate that is greater than a predetermined standard to be abnormal in the test data distribution. The determiner 150 may determine the test data value that is different from the standard distribution by greater than a predetermined standard to be abnormal in the test data distribution.

The determiner 150 estimates the sessions relating to the extracted test data value as a command and control channel. The determiner 150 may detect a command and control channel by synthesizing a plurality of test data distributions.

Figure 8:
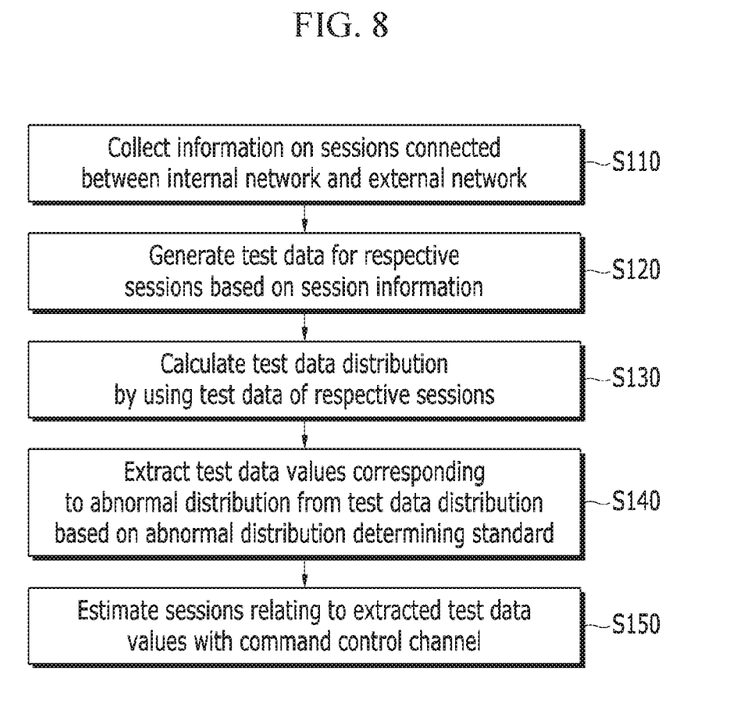
FIG. 8 shows a flowchart of a method for detecting a command and control channel according to an exemplary embodiment of the present invention.

FIG. 8 shows a flowchart of a method for detecting a command and control channel according to an exemplary embodiment of the present invention.

Referring to FIG. 8, the detecting device 100 collects information of the sessions connected between the external network 20 and the internal network 30 (S110). The session information represents various kinds of logs relating to the sessions, and includes departure information of sessions, destination information, a timestamp, an access duration, and a transmitted and received data size.

The detecting device 100 generates test data for respective sessions based on the session information (S120). The test data include at least one of an access period, an access duration, and a transmitted and received data size.

The detecting device 100 calculates a test data distribution by using test data of respective session (S130). The detecting device 100 calculates at least one of an access period distribution including a number of sessions for respective access periods, an access duration distribution including a number of sessions for respective access durations, and a data size distribution including a number of sessions for respective data sizes.

The detecting device 100 extracts test data values corresponding to the abnormal distribution from the test data distribution based on an abnormal distribution determination standard (S140).

The detecting device 100 estimates the sessions relating to the extracted test data value as a command and control channel (S150). The detecting device 100 may detect a command and control channel by synthesizing a plurality of test data distributions.

According to the exemplary embodiment of the present invention, the normal access and the malicious access may be distinguished by analyzing the communication characteristic of the command and control channel generated for the internal network attack. Therefore, according to the exemplary embodiment of the present invention, the attack without a signature may be detected as an attack caused by the command and control channel. According to the exemplary embodiment of the present invention, the gradually and precisely evolving attack on the internal network may be efficiently processed. According to the exemplary embodiment of the present invention, modified attacks or encrypted traffic may be detected so the attack on the internal network may be detected irrespective of attacking methods.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for detecting an attack on a first network by an attacker device connected to a second network, by identifying a command and control channel established between a communication device of the first network and the attacker device of the second network without a need for an attack signature, comprising:
    a non-transitory recording medium for recording program code, said program code comprising: code for monitoring a plurality of communication sessions between a first network and a second network, said first network and said second network are different networks;
    code for collecting log information of some of said plurality of sessions, generated between at least one communication device of the first network and at least one communication device of the second network;
    code for generating test data for respective sessions based on the log information, and calculating a test data statistical distribution based on test data of the sessions; and a determiner
    code for analyzing said test data statistical distribution to extract a test data value;
    code for identifying when said test data value is indicative of an abnormal distribution, using an abnormal distribution determination standard;
    code for estimating when said some of said plurality of sessions characterize a command and control channel;
    code for determining when said at least one communication device of the second network is an attacker device, based on said estimation, so as to prevent an attack on said first network;
    wherein said attack is at least one of a denial of service (DoS), personal information hacking, financial agencies hacking and cyber terrors.

2. The device of claim 1, wherein the test data include at least one of an access period, an access duration, and a transmitted and received data size.

3. The device of claim 2, wherein the test data distribution includes one of an access period distribution including a number of sessions for respective access periods, an access duration distribution including a number of sessions for respective access durations, and a data size distribution including a number of sessions for respective transmitted and received data sizes.

4. The device of claim 3, wherein said program further comprising code
    for determining a test data value with a number of sessions that is greater than a predetermined standard in the access period distribution as an abnormal distribution.

5. The device of claim 3, wherein said program further comprising code for determining
    a test data value with a number of sessions that is greater than a predetermined standard in the access duration distribution as an abnormal distribution.

6. The device of claim 3, wherein said program further comprising code for determining
    a test data value with a number of sessions that is greater than a predetermined standard in the data size distribution as an abnormal distribution.

7. The device of claim 3, wherein said program further comprising code for estimating
    sessions corresponding to an abnormal distribution in at least two distributions from among the access period distribution, the access duration distribution, and the data size distribution as a command and control channel.

8. The device of claim 1, wherein
    the log information includes at least one of departure information of respective sessions, destination information, a timestamp, an access duration, and a transmitted and received data size.

9. A method for detecting an attack on a first network by an attacker device connected to a second network, by identifying a command and control channel established between a communication device of the first network and the attacker device of the second network, without a need for an attack signature, comprising:
    generating test data for respective sessions based on log information of sessions generated between at least one communication device of the first network and at least one communication device of the second network, said first network and said second network are different networks;
    calculating a test data statistical distribution based on the generated test data of the sessions;
    extracting a test data value corresponding to the test data statistical distribution;
    identifying when said test data value is indicative of an abnormal distribution, using an abnormal distribution determination standard;
    estimating when said sessions relating to the extracted test data value characterize a command and control channel; and
    determining when said at least one communication device of the second network is an attacker device, based on said estimation, so as to prevent an attack on said first network;
    wherein said attack is at least one of a denial of service (DoS), personal information hacking, financial agencies hacking and cyber terrors.

10. The method of claim 9, wherein
    the test data include at least one of an access period, an access duration, and a transmitted and received data size.

11. The method of claim 10, wherein
    the test data distribution includes one of an access period distribution including a number of sessions for respective access periods, an access duration distribution including a number of sessions for respective access durations, and a data size distribution including a number of sessions for respective transmitted and received data sizes.

12. The method of claim 11, wherein the abnormal distribution determination standard is a reference value relating to a number of sessions, and the extracting of test data values corresponding to an abnormal distribution includes determining a test data value with a number of sessions that is greater than the reference value as an abnormal distribution in the test data distribution.

13. The method of claim 11, wherein the extracting of test data values corresponding to an abnormal distribution includes extracting test data values corresponding to an abnormal distribution from at least two distributions of the access period distribution, the access duration distribution, and the data size distribution, and the estimating of a command and control channel includes estimating sessions corresponding to the abnormal distribution from the at least two distributions as a command and control based on extracted test data values.

14. A method for detecting an attack on a first network by an attacker device connected to a second network, by identifying a command and control channel a established between a first communication device and a second communication device, without a need for an attack signature, comprising:

allowing the first communication device, connected to a first network, to access the second communication device, connected to a second network, and collect log information of generated sessions between the first communication device and the second communication device, said first network and said second network are different networks;

generating test data for respective sessions based on the log information;

acquiring a test data statistical distribution relating to a number of sessions for respective test data based on the test data of the sessions;

determining whether there is a test data value with a number of sessions that is greater than a predetermined standard in the test data distribution; and determining that the second communication device is an attacker device when a test data value with a number of sessions that is greater than a predetermined standard is found, so as to prevent an attack on said first network;

wherein said attack is at least one of a denial of service (DoS), personal information hacking, financial agencies hacking and cyber terrors.

15. The method of claim 14, wherein
the test data include at least one of an access period, an access duration, and a transmitted and received data size.

16. The method of claim 15, wherein
the test data distribution includes one of an access period distribution including a number of sessions for respective access periods, an access duration distribution including a number of sessions for respective access durations, and a data size distribution including a number of sessions for respective transmitted and received data sizes.

* * * * *